Patented Dec. 4, 1934

1,982,676

UNITED STATES PATENT OFFICE 1,982,676

POLYMERIZATION OF VINYL NAPHTHALENE

Walter E. Lawson, Wilmington, Del., assignor to E. I. du Pont de Nemours & Company, Wilmington, Del., a corporation of Delaware No Drawing. Application August 21, 1929, Serial No. 387,568

15 Claims. (Cl. 260—2)

This invention relates to new compositions of matter formed by the polymerization of vinyl naphthalene. More specifically this invention relates to new compositions of matter useful in molding compositions and lacquers. It furthermore relates to a method of polymerizing vinyl naphthalene.

The object of the invention is the production of a new and improved composition of matter. A still further object is the use of vinyl naphthalene in the preparation of material useful as a lacquer constituent, and a still further object is to discover means of polymerizing vinyl naphthalene.

These objects are accomplished by the following invention which consists in the polymerization of vinyl naphthalene by the application of heat, or by catalysts, or by the combination of catalysts and heat.

I have found that both the alpha and beta forms of vinyl naphthalene are readily polymerized by heat alone, by catalysts, or by catalysts and heat to yield polymers which are valuable as resins, are valuable in the preparation of varnishes and lacquers, and for the other purposes for which resins are used. The catalysts which I have found most useful are metallic chlorides, and peroxides.

In the examples below is set forth the general method of procedure whereby the new compositions of matter are formed. After the polymerization has taken place I separate out the polymer and treat it in the manner appropriate to the use to which it is to be put. If it is to be used as a lacquer it is dissolved in a suitable solvent such as aromatic hydrocarbons and their substituents, such as toluene, xylene, ethyl benzene, and their halogen substitution products, etc., or their mixtures may be used as solvents; esters, such as methyl acetate, ethyl acetate, etc., may also be employed. Alcohols as a class are nonsolvents and tend to precipitate the resin from its solutions.

Example 1

A sample of vinyl naphthalene was heated without a solvent for two hours in an oil bath maintained at 300° C., polymerizing to a light brown resin which was soluble in ethyl acetate. The films from this resin were slightly tacky to the touch after twelve hours' drying at room temperature.

Example 2

A sample of vinyl naphthalene in ethyl benzene solution was heated with two percent of benzoyl peroxide for three hours at 100 to 120° C. A fifty percent yield of polymer was obtained. Films from this resin were slightly tacky after two hours drying, but were hard dry in five hours at room temperature.

Example 3

Employing stannic chloride as a catalyst, standing overnight at room temperature led to the formation of a resin similar to that secured with benzoyl peroxide in the preceding example.

Example 4

A lacquer was made from the following formula and gave a hard tough finish that aged for one year without cracking or checking.

| | Parts |
|---|---|
| Polyvinyl naphthalene | 25 |
| Solvent (toluene 50%, xylene 50%) | 75 |

An advantage of this process is that vinyl naphthalene is made useful as the base from which to get polymerization products. A further advantage is that the polymer is of a light color. A still further advantage is that the extreme solubility of these resins in cheap solvents, and their insolubility in alcohol are exceptionally valuable from the standpoint of automobile finishes. A still further advantage is that since aromatic hydrocarbons can be used for solvents the solvent cost is considerably lower than for cellulose ester finishes.

It will be apparent from the listed examples that very wide variations in temperature are possible without detracting from the utility of the process.

Although specific examples of the process have been given, it is to be observed that many variations which will occur to persons skilled in the art can be made without departing from the legitimate scope of the invention. The invention is not to be construed as limited except as by the appended claims.

I claim:

1. Polymerized vinyl naphthalene.
2. The method of polymerizing vinyl naphthalene which comprises heating vinyl naphthalene to a temperature above atmospheric temperature and below the point of decomposition of the vinyl naphthalene.
3. The method of polymerizing vinyl naphthalene comprising the heating thereof to approximately 300° C.
4. The process of making polymerization products from vinyl naphthalene comprising heating a solution containing vinyl naphthalene to a temperature above atmospheric temperature but below the temperature of decomposition of vinyl naphthalene.

5. The process as in claim 4 in which the solvent used is ethyl benzene.

6. The method of making polymerization products of vinyl naphthalene comprising dissolving vinyl naphthalene in a solvent, and heating to a temperature above atmospheric, but below the temperature at which the solution is volatilized.

7. The method of making polymerization products of vinyl naphthalene comprising the solution of vinyl naphthalene in a solvent comprising ethyl benzene which contains benzoyl peroxide, and the heating thereof to a temperature of approximately 115° C.

8. The method of polymerizing vinyl naphthalene comprising treating it with a polymerization catalyst of the group consisting of benzoyl peroxide and stannic chloride.

9. The method of polymerizing vinyl naphthalene which comprises heating vinyl naphthalene above atmospheric temperature but below the decomposition temperature of vinyl naphthalene in the presence of a catalyst from a group consisting of benzoyl peroxide stannic chloride.

10. The method of making polymerized products of vinyl naphthalene which comprises heating vinyl naphthalene to a temperature between about 100° C. and about 300° C.

11. The method of making polymerized products of vinyl naphthalene which comprises heating vinyl naphthalene between about 100° C. and about 120° C.

12. The method of polymerizing vinyl naphthalene which comprises heating vinyl naphthalene in the presence of benzoyl peroxide.

13. The method of polymerizing vinyl naphthalene which comprises dissolving vinyl naphthalene in a solution containing benzoyl peroxide.

14. The method of polymerizing vinyl naphthalene which comprises dissolving vinyl naphthalene in a solution containing stannic chloride.

15. The method of polymerizing vinyl naphthalene which comprises dissolving vinyl naphthalene in a solution containing one of a group of compounds consisting of benzoyl peroxide and stannic chloride.

WALTER E. LAWSON.